UNITED STATES PATENT OFFICE.

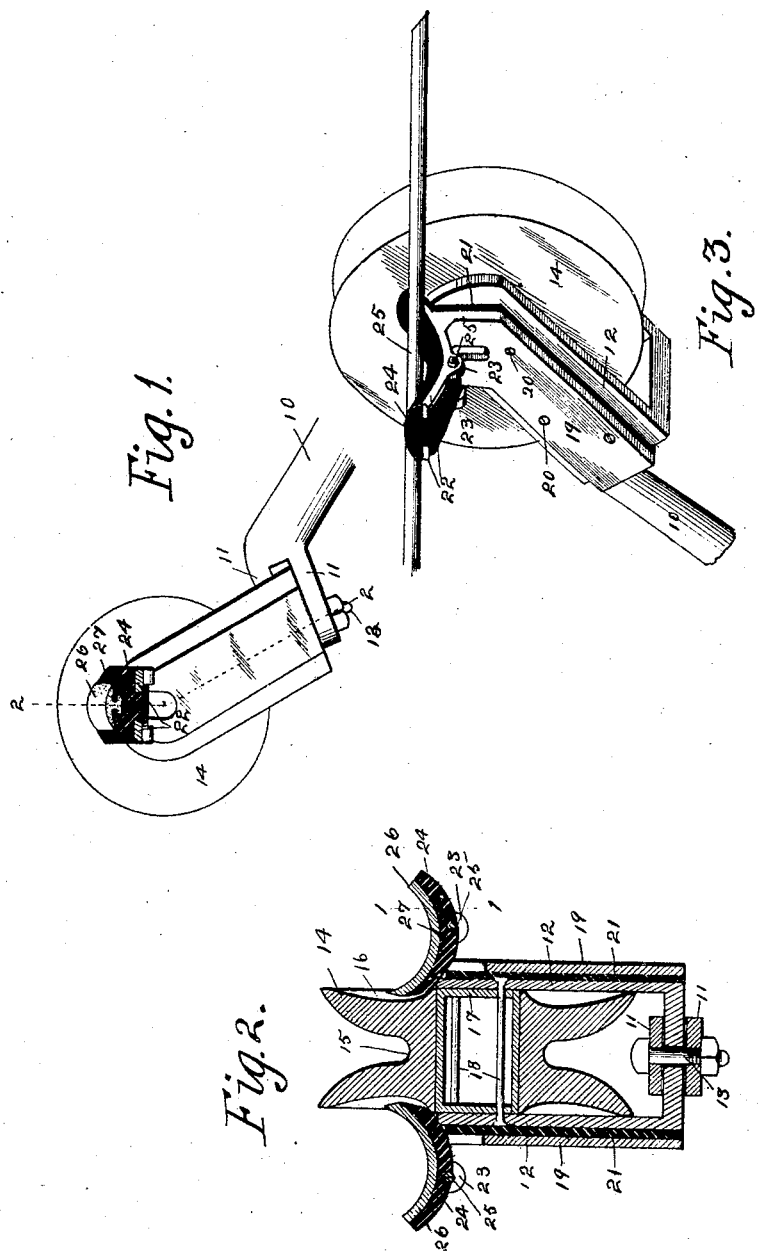

GEORGE W. KRAMER AND ALFRED G. HAGUE, OF DES MOINES, IOWA.

TROLLEY-CATCHER.

No. 915,193.      Specification of Letters Patent.      Patented March 16, 1909.

Application filed July 31, 1903. Serial No. 167,739.

*To all whom it may concern:*

Be it known that we, GEORGE W. KRAMER and ALFRED G. HAGUE, citizens of the United States, residing at Des Moines, in the county of Polk and State of Iowa, have invented a certain new and useful Trolley-Catcher, of which the following is a specification.

The objects of our invention are to provide a device of this class of simple, durable and inexpensive construction designed for use in the nature of an attachment, to be applied to an ordinary trolley pole; to catch the trolley when the trolley has been accidentally thrown off of the trolley wire; and to prevent the trolley from moving upwardly to position where it might strike the guy wires that support the trolley wire; and to hold the trolley in this position until it may be replaced on the wire. In this connection it is to be remembered that the principal danger which occurs when a trolley leaves the wire is, that the spring which normally holds the trolley elevated will tend to throw the trolley upwardly above the wire far enough to strike against the guy wires that support the trolley wire, with a tendency to break the guy wires and thus cause the trolley wire to break when its supporting guys are broken, and our invention is designed essentially for the purpose of catching the trolley wire when the trolley itself is accidentally removed from the wire and to hold the trolley at the side of the wire and in such position that it cannot strike or interfere with the supporting guy wires.

A further object is to provide a device of this class in which the trolley wheel itself is of the same size and shape as those now in common use and the trolley catcher attachment is also of such size and shape and is so arranged and disposed relative to the trolley wheel that the trolley wheel may pass under switches or branches in the trolley wire in the way now commonly done, and the trolley catcher attachment will not in any way interfere with this function of the trolley wheel, and our object is further to provide a trolley catcher with insulating devices so arranged that when the trolley wheel leaves the wire and the wire is caught upon the attachment, the wire will be insulated from the trolley pole and the current immediately shut off and the operator may then stop the car and replace the trolley in its proper position.

Our invention consists in certain details in the construction, arrangement and combination of the various parts of the device, whereby the objects contemplated are attained, as hereinafter more fully set forth, pointed out in our claims and illustrated in the accompanying drawings, in which—

Figure 1 shows a side elevation of a part of the trolley pole with a trolley wheel supported thereon and our improved trolley catcher applied thereto, said view being taken on the indicated line 1—1 of Fig. 2. Fig. 2 shows a vertical, sectional view on the indicated line 2—2 of Fig. 1, and Fig. 3 shows a perspective view of a part of a trolley pole and trolley with our attachment applied thereto, and showing a trolley wire engaged by the attachment. In this view we have illustrated a slight modification of the insulator of the attachment.

Referring to the accompanying drawings, we have used the reference numeral 10 to indicate the trolley pole having at its top the divided end 11. Mounted in this divided end is the substantially U-shaped trolley support 12 connected with the trolley pole by a bolt 13 which permits the said support to turn to a limited extent on the trolley pole.

The trolley wheel is indicated by the numeral 14 and is provided with an annular groove 15 to receive a trolley wire, and is provided on its sides with the grooves 16, said grooves tapering from the center of the wheel inwardly and then outwardly to the edge of the wheel, for purposes hereinafter made clear.

The numeral 17 indicates a hollow axle secured to the support 12 by means of the bolts 18. The axle is made hollow so that packing material containing oil may be placed therein for the purpose of lubricating the trolley wheel.

The parts just described are of the ordinary construction now in common use. Our improvement is in the nature of an attachment to be applied to the trolley support 12 before described, and it comprises two independent trolley catchers, one for each side of the support, both of which are of identical construction, so that but one will be hereinafter particularly described.

The reference numeral 19 indicates a metal plate to be attached to the outer surface of one of the sides of the support 12 by means of the screws 20, and an insulating plate 21 is placed between the plate 19 and the support 12. At the top of the plate 20 are two arms 22 integral with the plate and inclined downwardly and then upwardly from the plate, said arms being of segmental shape and being spaced apart a slight distance. On the lower end of each of the arms 22 near its central portion is a perforated lug 23. These arms 22 are designed to receive and support the trolley catcher 24. This trolley catcher is preferably made of insulating material; such for instance as vulcanized rubber or glass and is of segmental shape and provided on its sides with grooves to receive the arms 22. The inner end of the part 24 enters the adjacent groove 16 of the trolley wheel, as clearly shown in Fig. 2 of the drawings, and it is firmly secured to the arms 22 by means of the bolt 25 passed through the lugs 23 and through the part 24. In the top of the part 24 we have provided a groove designed to receive a wearing plate 26. This plate is provided with a longitudinal rib 27 on its under surface designed to enter the groove in the top of the part 24 and the wearing plate 26 is preferably made of metal. It also projects a slight distance into the groove 26 at its inner end.

In practical use, the attachment may be applied to an ordinary trolley by attaching the plates 19 and then inserting the insulator parts 24 between the arms 22 and holding them in position by means of the bolts 25. The said catchers are placed some distance below the upper periphery of the trolley wheel so that they will not in any way interfere with the trolley wheel when passing switches or branches in the trolley wire. If the trolley wheel should be accidentally thrown from the trolley wire, then the yielding pressure devices which hold the trolley pole upwardly will tend to throw the trolley up along one side of the trolley wire and then the catcher on the side of the trolley nearest the wire will engage the wire and slide along it without permitting the trolley to pass upwardly any further and holding the trolley in such position that it will not strike the guy wires that support the trolley wire. Of course, as soon as the trolley leaves the wire and engages the catcher, the current will be cut off, on account of the insulators of the attachment, and when this occurs the operators of the car may immediately stop the car and replace the trolley wheel on the wire. In some instances it is desirable to use a wearing plate on top of the insulator 24, and when this is desirable we attach the kind of wearing plate shown in Figs. 1 and 2. Under ordinary circumstances, however, this is not necessary. The feature of having the inner ends of the catchers entering the grooves 16 at the sides of the trolley wheel prevents all possibility of the wire entering between the trolley wheel and the adjacent end of the catcher, and by having the catchers arranged some distance below the upper periphery of the trolley wheel we prevent all possibility of the catchers interfering with the trolley wheel when passing under switches or branches in the trolley wire.

Having thus described our invention, what we claim and desire to secure by Letters Patent of the United States, therefore is—

1. The combination with a trolley pole and wheel, of a plate fixed to one side of the trolley pole and having laterally projecting arms at its upper end, their inner ends between the center and upper edge of the trolley wheel, and an insulator independently secured between said arms and projecting above them.

2. The combination with a trolley pole and wheel, of a plate fixed to one side of the trolley pole and having laterally projecting arms at its upper end, their inner ends between the center and upper edge of the trolley wheel, and an insulator independently secured to said arms and projecting above them, the upper edge of said insulator being curved from the trolley wheel downwardly to its central portion and then upwardly toward its outer end.

3. The combination with a trolley pole and wheel, of a plate fixed to one side of the trolley pole and having laterally projecting arms at its upper end, their inner ends between the center and upper edge of the trolley wheel, and an insulator independently secured to said arms and projecting above them, and a wearing plate detachably inserted in the top of the insulator arm.

4. In a device of the class described, a trolley pole, a trolley support swiveled in the pole, a trolley wheel mounted in the support and having grooves in its sides, and a trolley catcher on each side of the support, comprising a plate 19, an insulator plate between the plate 19 and the adjacent side of the trolley support, curved arms 22 projecting laterally from the upper end of the plate, a curved trolley catcher 24 made of insulating material having grooves therein to receive the curved arms 22, means for detachably securing the trolley catcher to said arms, the inner end of the trolley catcher inserted in the groove in the adjacent side of the trolley wheel, for the purposes stated.

5. In a device of the class described, a trolley pole, a trolley support swiveled in the pole, a trolley wheel mounted in the support and having grooves in its sides, and a trolley catcher on each side of the support, comprising a plate 19, an insulator plate between the plate 19 and the adjacent side of the trolley support, curved arms 22 projecting laterally from the upper end of the plate, a curved trolley catcher 24 made of insulating material having grooves therein to receive the curved arms 22, means for detachably securing the trolley catcher between said arms, the inner end of the trolley catcher inserted in the groove in the adjacent side of the trolley wheel, and a detachable wearing plate in the top of the trolley catcher.

GEORGE W. KRAMER.
ALFRED G. HAGUE.

Witnesses:
L. H. ORWIG,
THOMAS G. ORWIG.